United States Patent [19]

Misawa

[11] Patent Number: 5,081,344
[45] Date of Patent: Jan. 14, 1992

[54] DISTANCE MEASURING DEVICE USING BOTH ACTIVE AND PASSIVE DISTANCE DETECTION MODES

[75] Inventor: Atsushi Misawa, Tokyo, Japan

[73] Assignee: Fuji Photo Film Co., Ltd., Kanagawa, Japan

[21] Appl. No.: 545,739

[22] Filed: Jun. 29, 1990

[30] Foreign Application Priority Data

Jul. 13, 1989 [JP] Japan .................................. 1-180919

[51] Int. Cl.$^5$ .................................................. G01J 1/20
[52] U.S. Cl. ............................ 250/201.4; 250/201.8; 356/1
[58] Field of Search ............... 250/201.4, 201.6, 201.7, 250/201.8; 356/141, 152, 1, 4; 354/406, 407, 408

[56] References Cited

U.S. PATENT DOCUMENTS 4,818,865  4/1989  Matsui et al. ..................... 250/201.4
4,843,227  6/1989  Matsui et al. ..................... 250/201.4

Primary Examiner—Edward P. Westin
Assistant Examiner—Khaled Shami
Attorney, Agent, or Firm—Sughrue, Mion, Zinn, Macpeak & Seas

[57] ABSTRACT

A distance measuring device for use in automatic focusing of a camera combines an active system, in which light is projected onto an object and the distance of the object is measured in accordance with the received position of the reflected light on a line sensor, with a passive system in which the distance of the object is measured in accordance with a difference between the phases of two object images respectively formed in the line sensor through a pair of light receiving optical systems. The device uses both the light receiving optical systems and line sensors. Which of the active and passive system is used for measurement is decided in accordance with the light receiving position of the line sensor or the amount of the reflected projected light component.

3 Claims, 6 Drawing Sheets

DISTANCE MEASURING DEVICE USING BOTH ACTIVE AND PASSIVE DISTANCE DETECTION MODES

BACKGROUND OF THE INVENTION

1. Field of the Invention

The present invention relates to a distance measuring device and, in particular, to a distance measuring device which uses the principles of trigonometrical distance measurement and is used for automatic focusing in a camera.

2. Description of the Related Art

As a distance measuring system using the principles of trigonometrical distance measurement, conventionally, there has been known a system (hereinafter referred to as an active system) in which infrared light is onto an object to be photographed, light reflected from the object is received by a light receiving part (for example, a bisected SPD), and the distance of the object is measured in accordance with the light receiving centroid position of the light receiving part.

Also, there is also known another system (hereinafter referred to as a passive system) in which an image of an object is formed on two light receiving parts (CCD line sensors) by means of a pair of light receiving optical systems, and the distance of the object is measured in accordance with a difference between the phases of the two object images.

However, the above-mentioned active system has a problem in that, when the object is remote or has a low reflection factor, the infrared spot cannot be received by the light receiving part, which makes it impossible to measure the distance of the object. Also, in the passive system, there is a drawback that, when the object offers a low intensity of illumination or low contrast (that is, when the information on the object is insufficient), the distance to the object cannot be measured accurately.

On the other hand, the passive system may include a means which projects an auxiliary light onto the object when the object information is insufficient. In this case, however, an auxiliary light having a special pattern (for example, a striped pattern) must be projected so as to enable production of contrast. Also the fact that the object information is insufficient must be detected before the auxiliary light is projected, requiring a longer time to measure the distance of the object.

SUMMARY OF THE INVENTION

The present invention aims at eliminating the drawbacks found in the above-mentioned prior art systems.

Accordingly, it is an object of the invention to provide a distance measuring device which is capable of accurately measuring the distances of a wider range of objects by combining the above-mentioned active and passive systems, and which can also realize a compact structure only with a minimum of an increase in cost, when compared with the prior art active or passive systems.

In order to achieve the above object, according to the invention, there is provided a distance measuring device which comprises: a light projector part for projecting light an object; first and second light receiving optical systems respectively disposed on either side of the light projector part for measuring distances; a line sensor having first and second light receiving parts respectively at the image forming positions of the first and second light receiving optical systems, and including, in the light receiving areas of the first and second light receiving parts in which the images of the object are formed when the object is at a short distance, filters for selectively transmitting therethrough the range of wavelengths of the projected light; decision means for deciding whether the projected light is received through the filter or not; means, when the projected light is received through the filter, for measuring the distance of the object in accordance with the light receiving positions in the line sensor; and, means, when the projected light is not received through the filter, for measuring the distance of the object in accordance with a difference between the phases of the object images in the first and second light receiving parts of the line sensor.

Also, according to another aspect of the invention, there is provided a distance measuring device which comprises: a light projector part for projecting light onto an object; first and second light receiving optical systems respectively disposed on either side of the light projector part for measuring distances; a line sensor having first and second light receiving parts respectively disposed in the image forming positions of the first and second light receiving optical systems; decision means, in accordance with a difference between signals respectively obtained from the line sensor when the projected light is projected from the light projector part and when the light is not projected, for deciding whether the projected light is received or not by the line sensor in a predetermined amount required for distance measurement; means, when the predetermined (or greater) amount of projected light is received, for measuring the distance of the object in accordance with the light receiving position in the line sensor; and, means, when the predetermined amount of light is not received, for measuring the distance of the object in accordance with a difference between the phases of the object images in the first and second light receiving parts of the line sensor.

According to the invention, light for distance measurement is projected from a light projector part onto an object, and the reflected light thereof is received by two light receiving parts of a line sensor through two light receiving optical systems respectively disposed on either side of the light projector part. Here, the light can be received by means of light transmissive filters respectively provided in the light receiving areas of the light receiving parts only when the object is situated at a short distance. Then, the distance of the object is measured in accordance with the positions on the light receiving parts where the light is received. And when light cannot be received due to the fact that the object is situated at a long distance or the object has a low light reflection factor, the object image that can be obtained by natural light is received by the two light receiving parts and the distance of the object is measured in accordance with a difference between the phases of the thus received images.

Also, according to another embodiment of the invention, the light transmissive filters are not provided in the line sensor, but only a projected light component is detected from the difference between the outputs of the line sensor obtained when light is projected and when light is not projected, and, when the amount of the thus detected projected light component is equal to or more than a predetermined amount necessary for distance measurement, then the distance of the object is measured in accordance with the projected light receiving position in the line sensor, while, when the amount of the projected light component is less than the predetermined amount, then the distance of the object is measured by detecting the difference between the phases of the two images as in the above-mentioned case.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiments of the distance measuring device according to the present invention with reference to the accompanying drawings.

Figure 1:
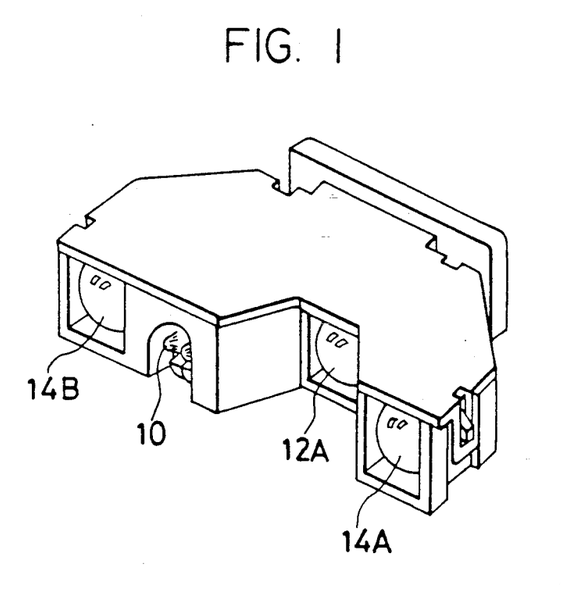
FIG. 1 is an exterior view of an embodiment of a distance measuring device according to the invention.
Figure 2:
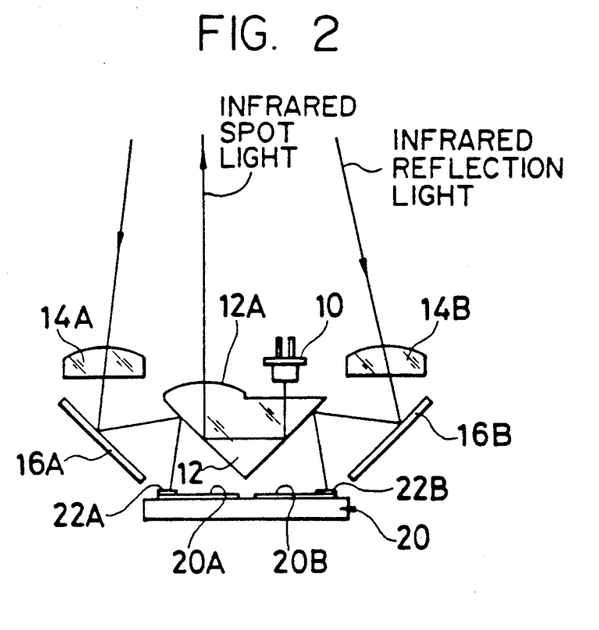
FIGS. 2 and 3 are respectively schematic views of the interior structure of the embodiment shown in FIG. 1.
Figure 3:
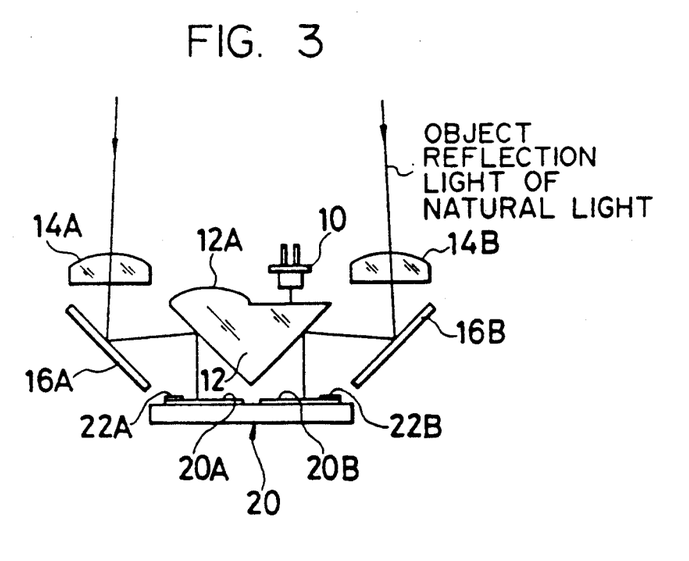

In FIG. 1, there is shown a unit exterior view of a distance measuring device according to the invention, and in FIGS. 2 and 3 these are shown schematic views of the interior structure of the distance measuring device shown in FIG. 1.

As shown in these figures, the distance measuring device mainly comprises an infrared ray emitting diode (IRED) 10, a prism 12, light receiving lenses 14A, 14B, mirrors 16A, 16B, a CCD line sensor module 20, and a signal processing part to be discussed later.

Figure 4:
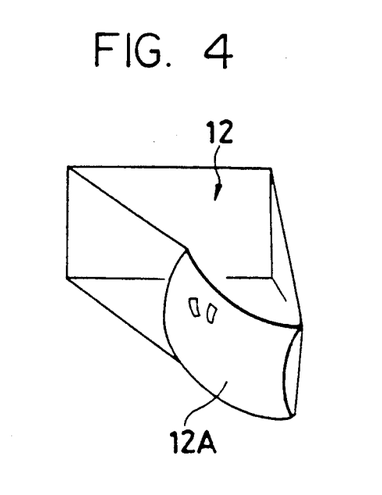
FIG. 4 is a perspective view of a prism shown in FIG. 2.

The prism 12, as shown in FIG. 4, is a rectangular prism with a light projection lens 12A formed integrally therewith. Infrared light from IRED 10 is reflected two times within the prism and then projected through the light projection lens 12A as an infrared light spot.

A pair of light receiving lens 14A, 14B are disposed on either side of the above-mentioned light projector part, respectively. The light receiving lens 14A forms, through the mirror 16A and prism 12, the reflected infrared light spot as well as the image of the object on the line sensor light receiving part 20A, which will be discussed later, of the sensor module 20, while the light receiving lens 14B similarly forms, through the mirror 16B and prism 12, the same light spot as well as the object image on the line sensor light receiving part 20B.

Figure 5:
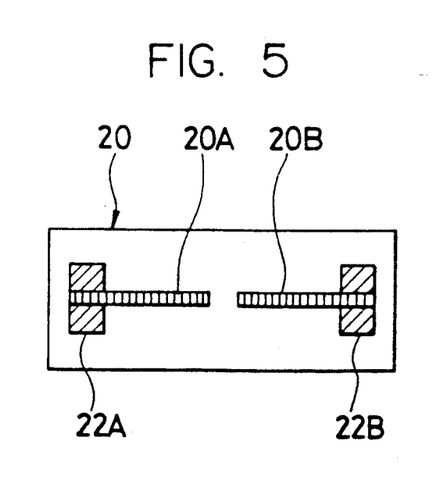
FIG. 5 is a plan view of a CCD line sensor module shown in FIG. 2.

The CCD line sensor module 20, as shown in FIG. 5, has a pair of line sensor light receiving parts 20A and 20B and further on the upper surfaces of parts of the outer portions of the respective light receiving parts 20A and 20B there are attached infrared ray transmissive filters 22A and 22B which are respectively adapted to selectively transmit therethrough the range of wavelengths of the infrared rays. In other words, these infrared ray transmissive filters 22A, 22B are disposed on the light receiving parts that are able to receive infrared light spots reflected by an object only when the object is situated at a short distance.

A description will now be given of the general operation of the signal processing part of the distance measuring device, which signal processing part is adapted to measure the distance of the object in accordance with signals from the CCD line sensor module 20.

Figure 6:
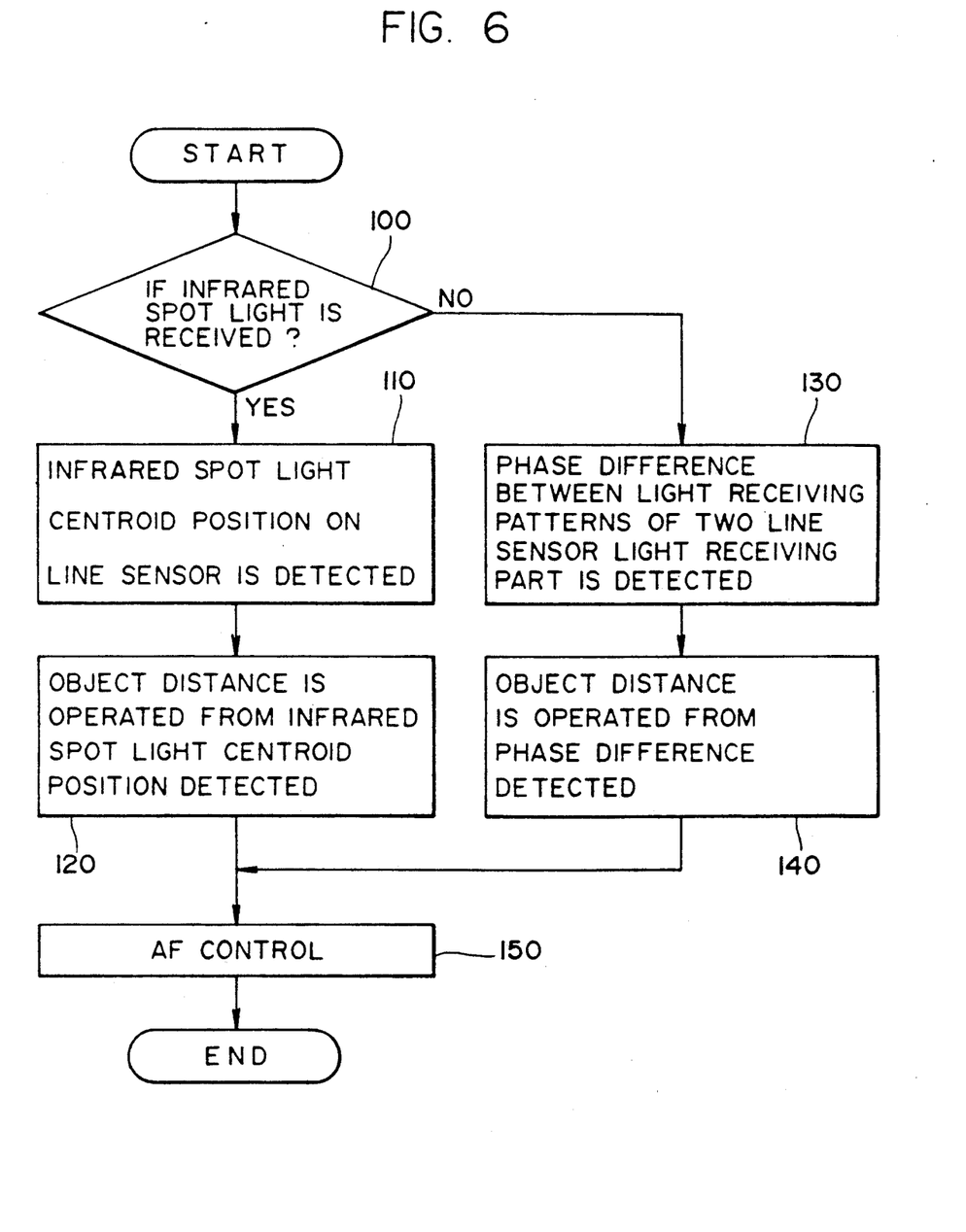
FIG. 6 is a flow chart used to illustrate the operation of a signal processing part of a distance measuring device according to the invention.

As shown in a flow chart in FIG. 6, at first, whether the infrared light spot is received through the infrared ray transmissive filters 22A, 22B or not is checked (Step 100). When the object is situated at a relatively short distance, as shown in FIG. 2, the infrared light spot can be received through the filters 22A, 22B and, in this case, the centroid position of the infrared spot light on the line sensor light receiving part is detected (Step 110). After then, the distance of the object is calculated from the detected centroid position of the infrared spot light (Step 120). Here, it should be noted that the centroid position of the infrared light spot and an the distance of the object correspond one for one to each other.

On the other hand, when the object is situated at a relatively long distance, as shown in FIG. 3, the infrared light spot cannot be received through the filters 22A, 22B. In this case, the difference between the phases of the light receiving patterns of the object images respectively formed on a pair of line sensor light receiving parts 20A, 20B is detected (Step 130). In such phase difference detection, with the light receiving patterns displaced by some number of pixels of the line sensor, a correlation operation is performed and the phase difference is detected from the amount of displacement obtained when the resultant correlation value becomes the greatest. After this, the distance to the object is calculated from the detected phase difference (Step 140).

As described above, when the object is situated at a comparatively short distance, the distance of the object can be measured in accordance with the receiving position of the infrared light spot and, when the object is at a comparatively long distance, the distance of the object can be measured in accordance with the phase difference detected. By means of the object distance obtained in this manner, the automatic focusing control of a taking lens in a camera can be performed (Step 150).

Whether the infrared light spot is received or not is decided, for example, according to whether the output of the portion of the line sensor that corresponds to the infrared ray transmissive filter exceeds a predetermined value (a value exceeding the level of natural infrared light) or not.

Figure 7:
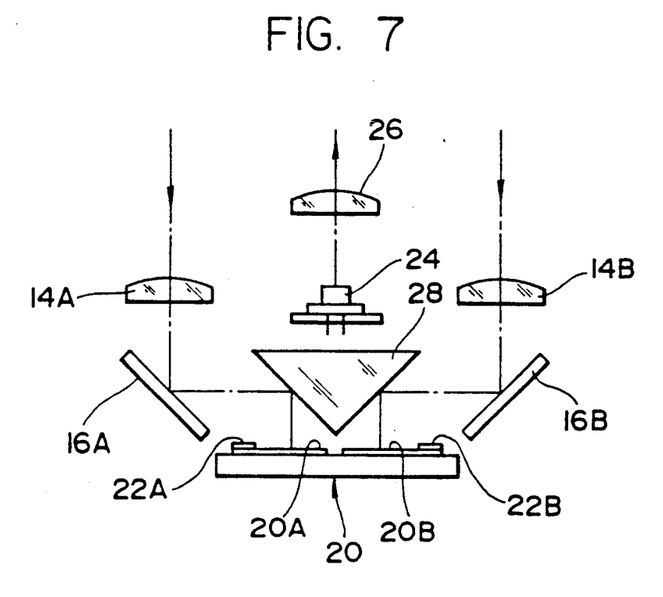
FIG. 7 is a schematic view of another embodiment of a signal detecting part of a distance measuring device according to the invention.

Now, referring to FIG. 7, there is shown a schematic view of another embodiment of a signal detecting part of a distance measuring device according to the invention, in which parts used in common with those in FIGS. 2 and 3 are given the same designations.

As can be clearly understood from comparison between the figures, in the present embodiment, a rectangular prism is not used in the light projector part, but there is added another light projecting lens 26. Thus, the infrared light of the IRED 24 is condensed by this light projecting lens 26 and is then projected as an infrared spot. Also, the prism 28 has two intersecting outer surfaces which function as part of the light receiving optical system.

Figure 8:
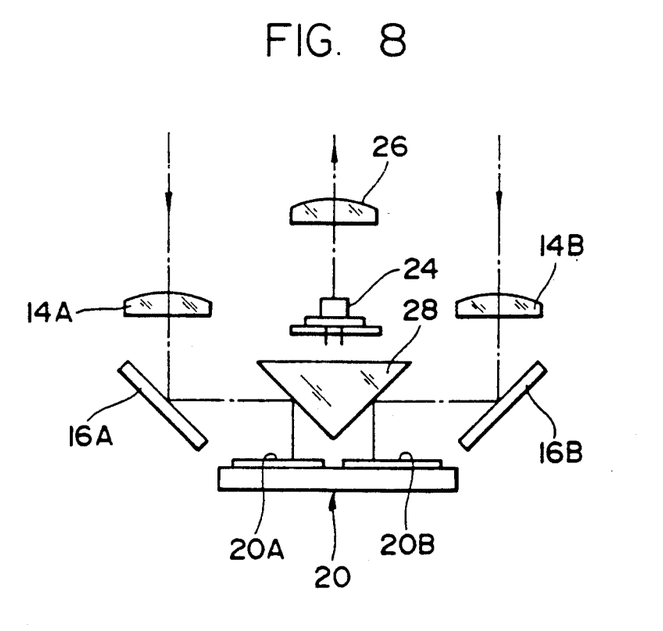
FIG. 8 is a schematic view of still another embodiment of a signal detecting part of a distance measuring device according to the invention; and, FIG. 9 is a block diagram of an embodiment of a signal processing part with respect to the signal detecting part shown in FIG. 8.

Referring next to FIG. 8, there is shown a schematic view of still another embodiment of a signal detecting part of a distance measuring device according to the invention. And, in FIG. 9, there is shown a block diagram of an embodiment of a signal processing part for the signal detecting part shown in FIG. 8. In FIG. 8, parts used in common with those in FIG. 7 are given the same designations.

As can be seen clearly from comparison with FIG. 7, the signal detecting part in FIG. 8 is different in that it has no infrared ray transmissive filters 22A, 22B on the respective upper surfaces of the light receiving parts 20A, 20B of the CCD line sensor 20, but the remaining portions thereof are identical with those of the signal detecting part in FIG. 7. For this reason, in the signal processing part in FIG. 9, there is provided a circuit or the like which is used to detect the infrared light without using infrared ray transmissive filters.

A description will be given below of an embodiment of a signal processing part of a distance measuring device according to the invention.

Figure 9:
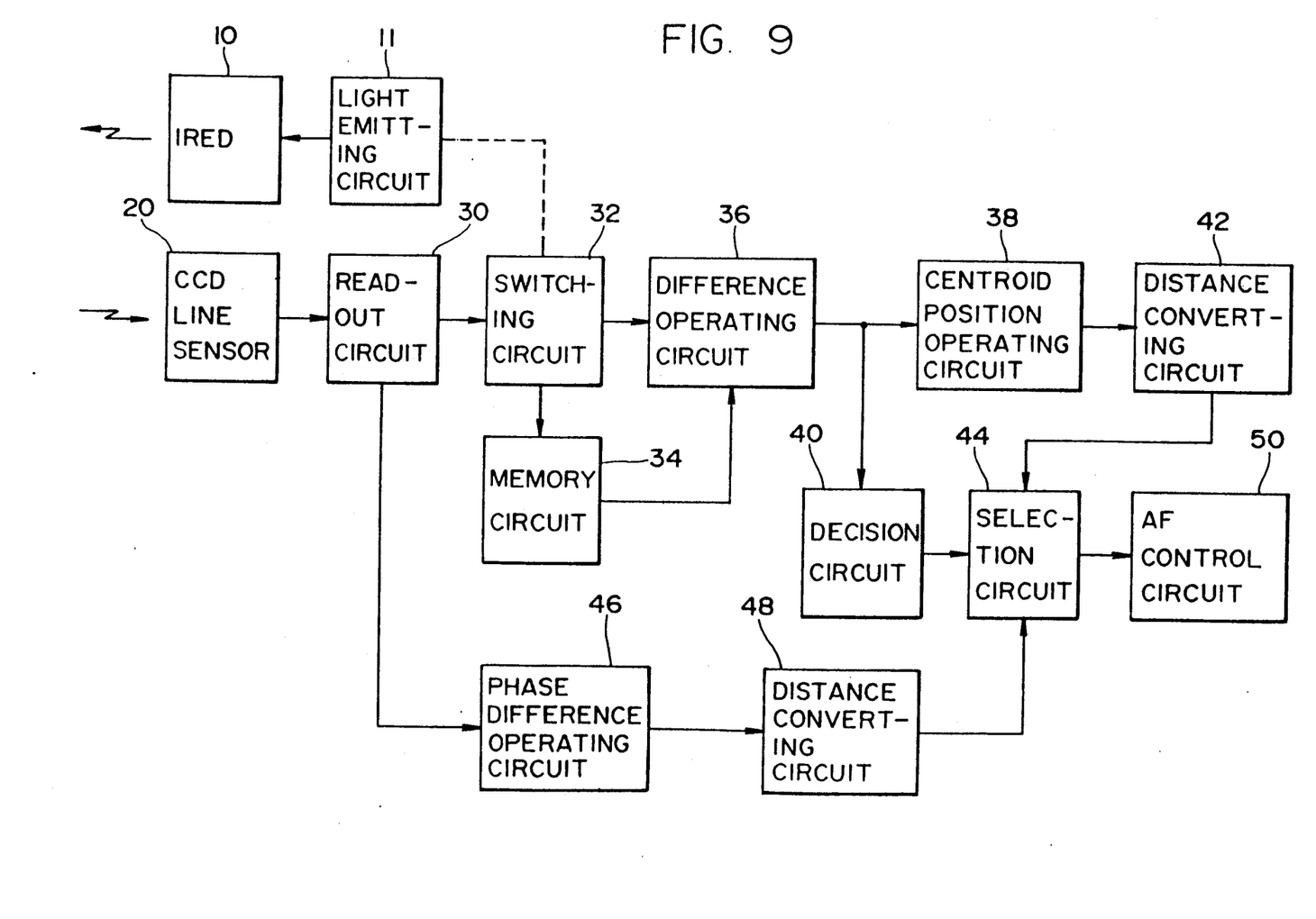

In FIG. 9, a light emitting circuit 11, when measuring the distance of the object, emits an IRED 11 to project infrared light. A read-out circuit 30 reads out the signals of the CCD line sensor 20 respectively in a condition where the infrared light is projected and in a condition where the infrared light is not projected, and then outputs the read-out signals to a switching circuit 32 sequentially. The switching circuit 32 outputs to a memory circuit 34 the signal that is read out in condition where the infrared light is projected to cause the memory circuit 34 to store the signal, and also outputs to the difference operating circuit 36 the signal that is read out in the condition where the infrared light is not projected.

The difference operating circuit 36 produces a difference pixel, by pixel, between the signal that is temporarily stored in the memory circuit 34 and the signal that is applied directly from the switching circuit 32, and outputs a signal indicating a projected infrared light component to an detecting circuit 38 for operating the centroid position of the infrared spot and to a decision circuit 40.

The centroid position circuit 38, in accordance with the signal indicating the projected infrared light component, finds the centroid position of the infrared spot light on the line sensor, and outputs to a distance converting circuit 42 a signal indicating the thus found centroid position. The distance converting circuit converts the centroid position input thereto into the distance of the object, and then outputs to the A input of a selection circuit 44 a signal indicating the thus converted object distance.

On the other hand, a phase difference circuit 46, in accordance with the signal that is read out from the read-out circuit 30, produces a difference between the phases of the light receiving patterns of the object images respectively formed on the pair of line sensor light receiving parts, and then outputs to a distance converting circuit 48 a signal indicating the resultant phase difference. The distance converting circuit 48 finds the object distance by converting the phase difference input thereto, and then applies a signal indicating the thus converted distance to the B input of the selection circuit 44.

The decision circuit 40, when the signal indicative of the projected infrared light component input from the difference circuit 36 is equal to or greater than a predetermined threshold value (a value necessary for distance measurement), decides that the infrared spot is received and outputs a signal which allows the selection circuit 44 to select the A input. When the signal indicative of the projected infrared light component is less than that the predetermined threshold value, the decision circuit 40 decides that the infrared spot light is not received and outputs a signal which allows the selection circuit 44 to select the B input.

An automatic focusing control circuit 50, in accordance with a signal input thereto through the above-mentioned selection circuit 44, performs focusing of a taking lens in a camera.

In the present embodiment, even when the object is located a relatively long distance away, the infrared spot can be received if the object has a high reflection factor, and the distance of the object can be measured in accordance with the received position of the infrared spot on the line sensor.

As has been described hereinbefore, according to the invention, a distance measuring device can be used in an active system mode by adding only a simple mechanism to an ordinary passive system device, so that the merits of both systems can be obtained. As an added advantage, the measurable distance range can be widened. When the object is situated at a short distance, the distance is primarily measured according to the active system, so that the length of a base line is short and thus the shortest measuring distance can be shortened. When the object is at a long distance, the distance is generally measured according to the passive system, so that the base line length is long and thus the distance can be measured with higher accuracy.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A distance measuring device comprising:
 a light projector part for projecting measuring light onto an object;
 first and second light receiving optical systems respectively disposed on either side of said light projector part;
 a line sensor having first and second light receiving parts respectively disposed on image forming positions of said first and second light receiving optical systems, said line sensor including filters for selectively transmitting the wavelength range of said measuring light, said filters respectively being disposed in the respective light receiving areas of said first and second light receiving parts where the images of said object are formed when said object is situated within a first distance range;
 decision means for deciding whether said measuring light is received through said filters or not;
 means, when said measuring light is received through said filters, for measuring the distance of said object in accordance with the receiving position of said measuring light in said line sensor; and, means, when said measuring light is not received through said filters, for measuring the distance of said object in accordance with a different between the phases of the object images in said first and second light receiving parts of said line sensor.

2. A distance measuring device comprising:

a light projector part for projecting measuring light onto an object;

first and second light receiving optical systems respectively disposed on either side of said light projector part;

a line sensor having first and second light receiving parts respectively disposed on image forming positions of said first and second light receiving optical systems;

decision means for deciding whether said measuring light is received by said line sensor in an amount equal to or greater than a predetermined amount necessary for distance measurement, in accordance with a difference between signals from said line sensor respectively obtained when said measuring light is projected from said light projector part and when said light is not projected;

means, when at least said predetermined amount of said measuring light is received, for measuring the distance of said object in accordance with the receiving position of said light in said line sensor; and, means, when said predetermined amount of said measuring light is not received, for measuring the distance of said object in accordance with a difference between the phases of the object images in said first and second light receiving parts of said line sensor.

3. A distance measuring device as claimed in claim 1, wherein said first distance range comprises a range of object distances wherein measuring light emitted by said light projector part toward said object can be reflected by said object in sufficient quantity to permit distance measurement.

* * * * *